(12) United States Patent
Suzuki et al.

(10) Patent No.: US 6,738,763 B1
(45) Date of Patent: May 18, 2004

(54) INFORMATION RETRIEVAL SYSTEM HAVING CONSISTENT SEARCH RESULTS ACROSS DIFFERENT OPERATING SYSTEMS AND DATA BASE MANAGEMENT SYSTEMS

(75) Inventors: Hiroyuki Suzuki, Kawasaki (JP); Masaaki Mitani, Kawasaki (JP); Masayoshi Itakura, Kawasaki (JP); Akihiko Ogawa, Odawara (JP); Hirotoshi Fujibe, Kobe (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 09/603,772

(22) Filed: Jun. 26, 2000

(30) Foreign Application Priority Data

Oct. 28, 1999 (JP) .......................... 11-306903

(51) Int. Cl.$^7$ .............................. G06F 17/30
(52) U.S. Cl. ................ 707/5; 707/2; 707/3; 707/6; 707/7; 707/531; 707/536; 707/542; 704/2; 704/8; 704/9; 704/260
(58) Field of Search ............... 707/3, 5, 6, 7, 707/531, 536, 542; 704/8, 260, 2, 9; 715/540; 717/6; 345/474

(56) References Cited

U.S. PATENT DOCUMENTS

| 5,337,233 A | * | 8/1994 | Hofert et al. ............... 715/540 |
| 5,369,761 A | * | 11/1994 | Conley et al. ................ 707/2 |
| 5,384,700 A | * | 1/1995 | Lim et al. ................... 707/531 |
| 5,432,948 A | * | 7/1995 | Davis et al. .................... 704/2 |
| 5,634,134 A | * | 5/1997 | Kumai et al. ............... 707/536 |
| 5,758,314 A | * | 5/1998 | McKenna ....................... 704/8 |
| 5,778,361 A | * | 7/1998 | Nanjo et al. .................... 707/5 |
| 5,787,452 A | * | 7/1998 | McKenna ................... 707/536 |
| 5,799,303 A | * | 8/1998 | Tsuchimura .................... 707/7 |
| 5,802,539 A | * | 9/1998 | Daniels et al. ............... 707/542 |
| 6,081,774 A | * | 6/2000 | de Hita et al. .................. 704/9 |
| 6,113,650 A | * | 9/2000 | Sakai ............................. 717/6 |
| 6,115,686 A | * | 9/2000 | Chung et al. ................ 704/260 |
| 6,314,469 B1 | * | 11/2001 | Tan et al. .................... 709/245 |
| 6,388,668 B1 | * | 5/2002 | Elliott ......................... 345/474 |
| 6,389,386 B1 | * | 5/2002 | Hetherington et al. ......... 704/8 |

FOREIGN PATENT DOCUMENTS

| JP | 62011932 | 1/1987 |
| JP | 3150668 | 6/1991 |
| JP | 5334363 | 12/1993 |
| JP | 6060129 | 3/1994 |

* cited by examiner

Primary Examiner—Thuy Pardo
(74) Attorney, Agent, or Firm—Greer, Burns & Crain, Ltd.

(57) ABSTRACT

An information retrieval system whereby identical search results can be derived irrespective of the kind of DBMS or OS. A keyword normalizing device normalizes a keyword transmitted from a client through a network. A normalized data searching device then searches normalized data in a data storage section for data corresponding to the normalized keyword, and supplies the data to source data acquiring device. The source data acquiring device acquires source data associated with the normalized data supplied thereto, from among source data in the data storage section, and supplies the acquired source data to a sorting device. The sorting device first sorts the normalized data and then the source data in order of the sorted normalized data, and supplies the resulting source data to a source data supply device. The source data supply device transmits the source data to the client through the network.

12 Claims, 13 Drawing Sheets

| Character | Applicable Normalization Rule |
|---|---|
| Half-size symbol | left unchanged |
| Half-size uppercase alphabetic character | normalized to half-size lowercase alphabetic character |
| Half-size lowercase alphabetic character | left unchanged |
| Full-size symbol | normalized to half-size counterpart, if any, and left unchanged if no half-size counterpart exists |
| Full-size numeric character | normalized to half-size numeric character |
| Full-size uppercase alphabetic character | normalized to half-size lowercase alphabetic character |
| Full-size lowercase alphabetic character | normalized to half-size lowercase alphabetic character |
| Full-size alphabetic symbol | normalized to half-size alphabetic symbol |
| Full-size hiragana character | left unchanged |
| Full-size katakana character | normalized to full-size hiragana character |
| Half-size katakana character | normalized to full-size hiragana character (for 2 bytes of katakana character plus sonant mark/p-sound sign, to full-size hiragana counterpart) |
| Full-size uppercase/lowercase character | for Cyrillic character, Greek character, Roman numeral, etc., normalized to full-size uppercase character |
| Extended character | normalized to standard character |

FIG. 5

| | | |
|---|---|---|
| Half-size uppercase character & Half-size lowercase character | A=a | |
| Half-size alphabetic character & Full-size alphabetic character | A=a=A=a | |
| Half-size symbol & Full-size symbol | @=＠ | |
| Half-size numeric character & Full-size numeric character | 1=１ | |
| Half-size katakana character, Full-size katakana character & Full-size hiragana character | ｱ=ア=あ | |
| Half-size katakana character with sonant mark/p-sound sign, Full-size katakana character & Full-size hiragana character | ﾊﾟ=パ=ぱ | |
| Full-size uppercase Greek character & Full-size lowercase Greek character | Π=π | |
| Full-size uppercase Cyrillic character & Full-size lowercase Cyrillic character | Я=я | |
| Full-size uppercase Roman numeral & Full-size lowercase Roman numeral (standard Kanji) | Ⅳ=ⅳ | 8757, EEF2 |
| Full-size symbol (standard character) & Full-size symbol (extended character) | √=√ | 81E3, 8795 |

FIG. 6

|  | 40 |  |
|---|---|---|
| 00 | | |
| 1F | Control characters | |
| 20 | Roman characters | |
| 7F / 80 / 81 | | Common full-size symbols(81), Full-size numeric characters(82), Full-size uppercase alphabetic characters(82), Full-size lowercase alphabetic characters(82), Full-size hiragana characters(82), Full-size katakana characters(83), Full-size uppercase Greek characters(83), Full-size lowercase Greek characters(83), Full-size uppercase Cyrillic characters(84), Full-size lowercase Cyrillic characters(84), Full-size line symbols(84), Vacant(85-86), Full-size circled numeric characters(87), Full-size uppercase Roman numerals(87), Various full-size condensed symbols(87), JIS kanji characters(88-9F) |
| 9F | | |
| A0 | Katakana characters | |
| DF / E0 | | JIS kanji characters (E0-EA) |
| EA | | |
| EB | | |
| EC | | Vacant (EC) |
| EF | | Extended kanji characters (ED-EE), Full-size lowercase Roman numerals (EE), NOT, OR signs, Quotation marks (EE) |
| F0 | | Vacant (F0-F9) Full-size lowercase Roman numerals (FA), Full-size uppercase Roman numerals (FA),NOT, OR signs, Quotation marks (FA),Full-size abbreviated symbols (㈱), №, TEL (FA) |
| FF | | |

FIG. 7

| Input Title Column | Normalized Title Column | Input Author Column | Normalized Author Column | Price |
|---|---|---|---|---|
| すばる星のきらめき | すばる星のきらめき | 大門泰介 | 大門泰介 | 2,000 |
| 吟遊詩人たちの夢 | 吟遊詩人たちの夢 | 鈴木大介 | 鈴木大介 | 1,500 |
| スバルとプレヤデス星団 | すばるとぷれやです星団 | H.Suzuki | h.suzuki | 2,300 |
| スバル派詩人 | すばる派詩人 | M.Mitani | m.mitani | 2,000 |

FIG. 10

INFORMATION RETRIEVAL SYSTEM HAVING CONSISTENT SEARCH RESULTS ACROSS DIFFERENT OPERATING SYSTEMS AND DATA BASE MANAGEMENT SYSTEMS

BACKGROUND OF THE INVENTION (1) Field of the Invention

The present invention relates to an information retrieval system, and more particularly, to an information retrieval system for searching a data storage section for data corresponding to a keyword supplied thereto and outputting the data.

(2) Description of the Related Art

In cases where a language is to be processed by a computer, care must be taken since the language itself may have a plurality of characters having the same meaning or indicating the same sound or even an identical character may have different forms of representation handled distinctively within a computer. The former applies, for example, to "hiragana characters" as opposed to "katakana characters", and the latter applies to "full-size characters" as opposed to "half-size characters", all used in the Japanese language.

Thus, in the case where there are a plurality of characters indicating the same sound or having the same meaning, how to handle these characters is a matter of importance. For example, where the output order of character strings derived as a result of the search of a database or the like is determined, the display results vary depending upon which characters are given priority.

Since the order of priority is determined in individual databases, a problem arises in that the display format differs from database to database, causing inconvenience.

Also, where database-related application software is ported to another OS (Operating System) or DBMS (Data Base Management System), an inconvenience arises in that search results look different, even though the application software used is the same.

Further, in the case of searching databases held by servers from a client connected to a network, it is practically difficult for the user to recognize the kind of OS or DBMS used in servers, giving rise to a problem that apparent search results vary depending on the server used.

SUMMARY OF THE INVENTION

An object of the present invention is to provide an information retrieval system which ensures consistent search results even with different OSs or DBMSs.

To achieve the above object, there is provided an information retrieval system for searching a data storage section for data corresponding to a keyword supplied thereto and outputting the data. The information retrieval system comprises keyword normalizing means for normalizing a keyword supplied thereto, normalized data searching means for searching a normalized data group generated by normalizing original data by a process similar to that of the keyword normalizing means, from among data stored in the data storage section, to find normalized data corresponding to the keyword normalized by the keyword normalizing means, source data acquiring means for acquiring, from the data storage section, source data which is original data stored in association with the normalized data acquired by the normalized data searching means, sorting means for sorting the source data acquired by the source data acquiring means by looking up the corresponding normalized data, and source data supply means for supplying the source data sorted by the sorting means to a device which has requested search.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a chart exemplifying rules applied when data is normalized in the embodiment shown in FIG. 2;

FIG. 6 is a chart exemplifying groups of characters that are regarded as identical according to the rules shown in FIG. 5;

FIG. 7 is a chart illustrating the correspondence between characters and codes in the Shift-JIS code;

FIG. 10 is a chart showing, by way of example, data stored in the database appearing in FIG. 2;

DESCRIPTION OF THE PREFERRED EMBODIMENTS

An embodiment of the present invention will be hereinafter described with reference to the drawings.

Figure 1:
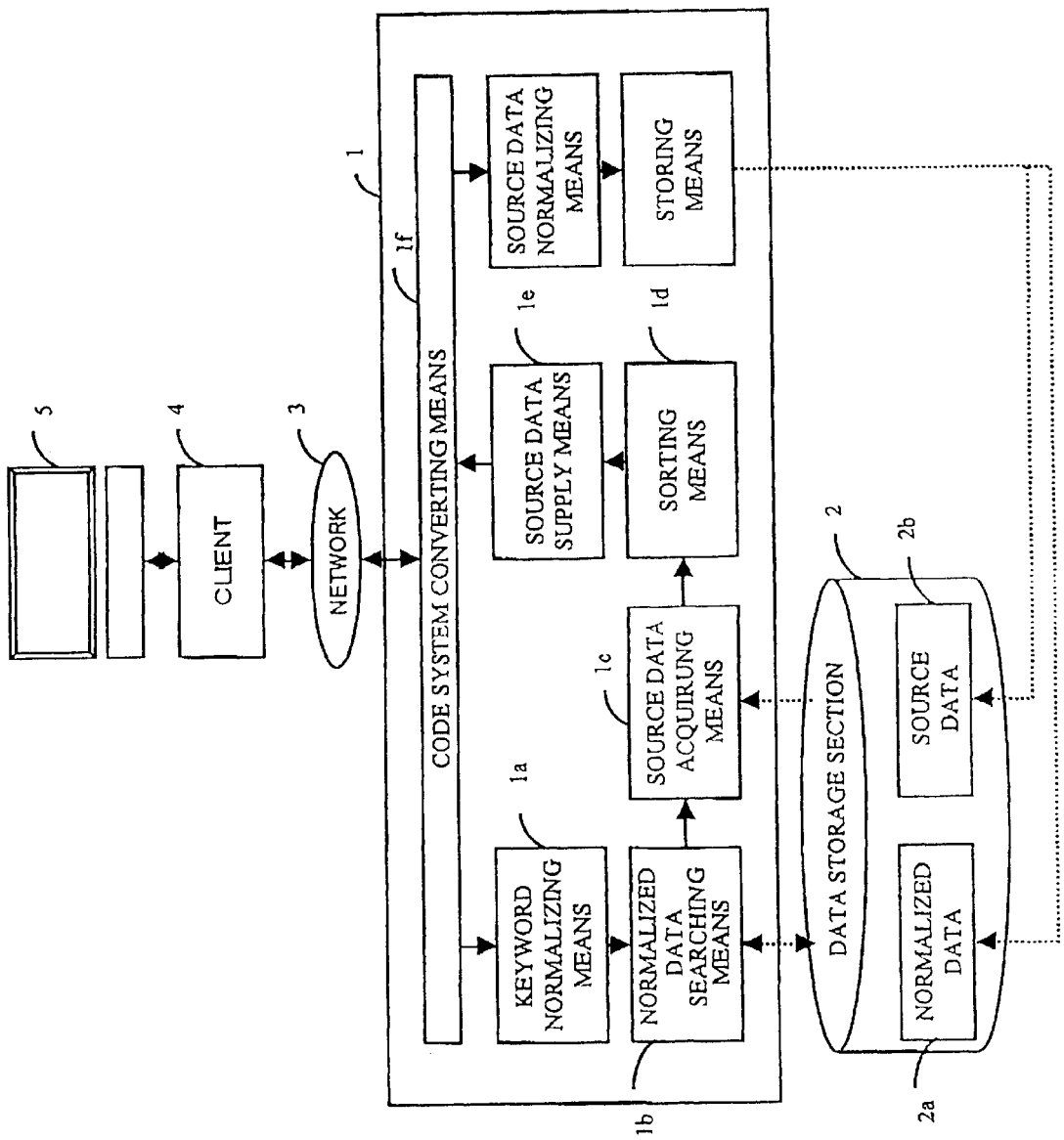
FIG. 1 is a diagram illustrating the principle of operation according to the present invention.

FIG. 1 illustrates the principle of operation according to the present invention. As seen from the figure, when data search has been requested from a client 4 connected via a network 3, an information retrieval system 1 according to the present invention searches data stored in a data storage section 2 and transmits the obtained data to the client 4 through the network 3.

The data storage section 2 stores source data 2b, which is original data, and normalized data 2a obtained by normalizing the source data, in a manner associated with each other.

The network 3 is, for example, the Internet.

The client 4 comprises, for example, a personal computer or the like and requests, via the network 3, the information retrieval system 1 to search for specified information.

A display device 5, which is a CRT (Cathode Ray Tube) monitor or the like, for example, displays the information supplied from the client 4.

The information retrieval system 1 comprises keyword normalizing means 1a, normalized data searching means 1b, source data acquiring means 1c, sorting means 1d, source data supply means 1e, and code system converting means 1f.

The keyword normalizing means 1a normalizes a keyword supplied from the client 4 according to predetermined rules (described in detail later).

The normalized data searching means 1b searches the normalized data 2a, which is generated by normalizing the source data 2b, or original data, by the same rules as adopted in the keyword normalizing means 1a, from among data stored in the data storage section 2, to find normalized data corresponding to the keyword normalized by the keyword normalizing means 1a.

The source data acquiring means 1c acquires, from among the source data 2b in the data storage section 2, source data which is the original data stored in association with the normalized data acquired by the normalized data searching means 1b.

The sorting means 1d sorts the normalized data acquired by the normalized data searching means 1b according to a predetermined rule, and then sorts the source data acquired by the source data acquiring means 1c by looking up the thus-sorted normalized data.

The source data supply means 1e supplies the source data sorted by the sorting means 1d to the device which has requested the search.

The code system converting means 1f converts input data of one code system to corresponding data of another code system. For example, in the case where the information retrieval system 1 employs the Shift-JIS code system whereas the client 4 employs the JIS code system, the code system converting means 1f performs conversion from JIS code to Shift-JIS code, as well as conversion from Shift-JIS code to JIS code.

Operation in accordance with the above principle will be now described. In the following, normalization of hiragana characters, katakana characters and half-size katakana characters will be explained by way of example.

Let it be assumed that the full-size katakana characters "イチゴ", for example, are input from the client 4 as a keyword. The keyword is transmitted over the network 3 and supplied to the information retrieval system 1.

In the information retrieval system 1, the code system converting means 1f converts the received keyword into a code system conforming to the internal format of the information retrieval system 1, and the keyword normalizing means 1a then normalizes the thus-converted keyword. In this case, the keyword normalizing means 1a converts (normalizes) full-size katakana characters, half-size katakana characters and full-size hiragana characters all to full-size hiragana characters. Accordingly, since, in this example, the keyword consists of the full-size katakana characters "イチゴ", the keyword normalizing means 1a converts these characters to the full-size hiragana characters "いちご".

On receiving the normalized keyword supplied from the keyword normalizing means 1a, the normalized data searching means 1b searches the normalized data 2a in the data storage section 2 and acquires applicable data.

Let it be assumed that "いちご白書", "いちごがむ", "いちご抄" and "厚生白書" are stored as the normalized data 2a and that "いちご白書", "ｲﾁｺﾞｶﾞﾑ, (half-size katakana characters)", "イチゴ抄" and "厚生白書" are stored as the source data associated respectively therewith. In this case, since the normalized data searching means 1b searches the normalized data 2a for all normalized data including the full-size hiragana characters "いちご", it acquires "いちご白書", "いちごがむ" and "いちご抄".

The source data acquiring means 1c acquires, from among the source data 2b in the data storage section 2, source data associated with the normalized data acquired by the normalized data searching means 1b. In this example, "いちご白書", "ｲﾁｺﾞｶﾞﾑ (half-size katakana characters)" and "イチゴ抄" are acquired.

The sorting means 1d sorts the normalized data acquired by the normalized data searching means 1b. In this example, "いちご白書", "いちごがむ" and "いちご抄" are a target of sorting, and the sorting is carried out according to the magnitude of the code values of the characters "白", "が" and "抄" in the applicable code system that follow the common character string "いちご". The characters "白", "が" and "抄" have the code values "9492", "82AA" and "8FB4", respectively, in the Shift-JIS code system, and have the code values "767D", "304C" and "6284", respectively, in the UNICODE system. Accordingly, if the character strings are sorted in ascending order of code value, they are rearranged in the order "いちごがむ", "いちご抄" and "いちご白書" in both code systems.

Then, looking up the thus-sorted normalized data, the sorting means 1d sorts the source data. In this example, the result of the sorting becomes "ｲﾁｺﾞｶﾞﾑ", "イチゴ抄" and "いちご白書".

The source data supply means 1e supplies, through the network 3, the thus-sorted source data to the client 4 which has made the request.

Consequently, "ｲﾁｺﾞｶﾞﾑ", "イチゴ抄" and "いちご白書" are displayed in this order, as data resulting from the search, on the display device 5 connected to the client 4.

With conventional information retrieval systems, in cases where there are a plurality of characters indicating the same sound or having the same meaning and sorting is performed with respect to such characters, search results can often be displayed differently in different systems, because the order of priority of the characters differs from one OS or DBMS to another (in the above example, the order of priority of full-size katakana characters, full-size hiragana characters and half-size katakana characters differs from one OS or DBMS to another). However, in the information retrieval system 1 of the present invention shown in FIG. 1, normalized data is used as a target of search, sorting is performed with respect to the normalized data obtained as a result of the search, and corresponding source data is acquired and sorted in the same order, whereby identical search results can be derived irrespective of the system used.

An example of configuration according to an embodiment of the present invention will be now described.

Figure 2:
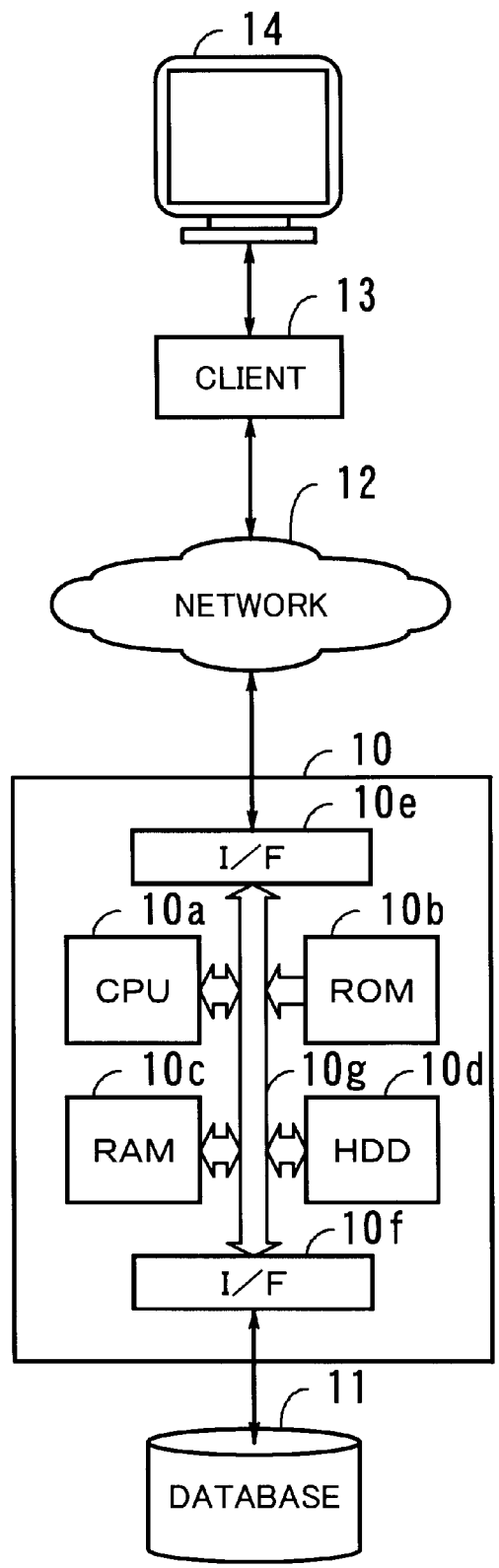
FIG. 2 is a block diagram exemplifying a configuration according to an embodiment of the present invention.

FIG. 2 illustrates the configuration according to the embodiment of the present invention. As seen from the figure, when requested to perform a search from a client 13 connected via a network 12, an information retrieval system 10 according to the present invention searches the data stored in a database 11 and transmits the obtained data to the client 13 over the network 12.

The database 11 stores source data, which is original data, and normalized data obtained by normalizing the source data, in a manner associated with each other.

The network 12 is, for example, the Internet.

The client 13 comprises, for example, a personal computer or the like and makes a request via the network 12 to the information retrieval system 10 to search for specified information.

A display device 14, which is a CRT (Cathode Ray Tube) monitor or the like, for example, displays the information supplied from the client 13.

The information retrieval system 10 comprises a CPU (Central Processing Unit) 10a, a ROM (Read Only Memory) 10b, a RAM (Random Access Memory) 10c, an HDD (Hard Disk Drive) 10d, I/Fs (Interfaces) 10e and 10f, and a bus 10g.

The CPU 10a controls the individual sections of the system and also performs various computations in accordance with an application program etc. stored in the HDD 10d.

The ROM 10b stores basic programs executed by the CPU 10a, data and the like.

The RAM 10c temporarily stores programs according to which the CPU 10a performs computation, as well as data derived in the middle of computation.

The HDD 10d stores various application programs executed by the CPU 10a, data, etc.

The I/F 10e performs suitable conversion of the form of representation etc. between data on the network 12 and data in the information retrieval system 10, to permit exchange of data with the network 12.

The I/F 10f performs conversion of the form of representation etc. when exchanging data with the database 11.

The bus 10g interconnects the CPU 10a, the ROM 10b, the RAM 10c, the HDD 10d and the I/Fs 10e and 10f, to permit exchange of data between these elements.

The operation of the embodiment described above will be now explained.

First, a process of registering data in the database 11 appearing in FIG. 2 will be described.

Figure 3:
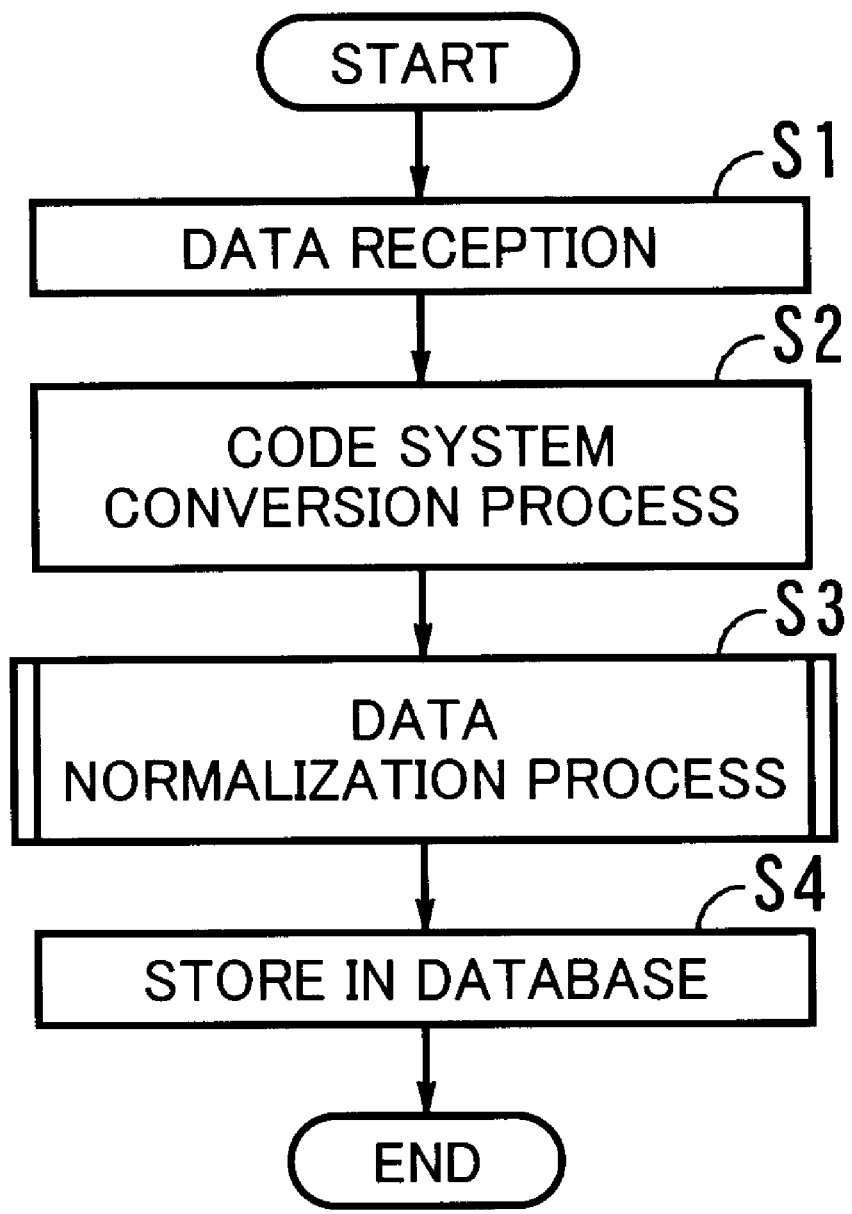
FIG. 3 is a flowchart showing an example of a process executed when data is stored in a database appearing in FIG. 2.

FIG. 3 is a flowchart illustrating an example of a process executed when new data is registered. Upon start of the process shown in the flowchart, the following steps are executed.

[S1] The CPU 10a receives data transmitted thereto via the network 12.

Figure 4:
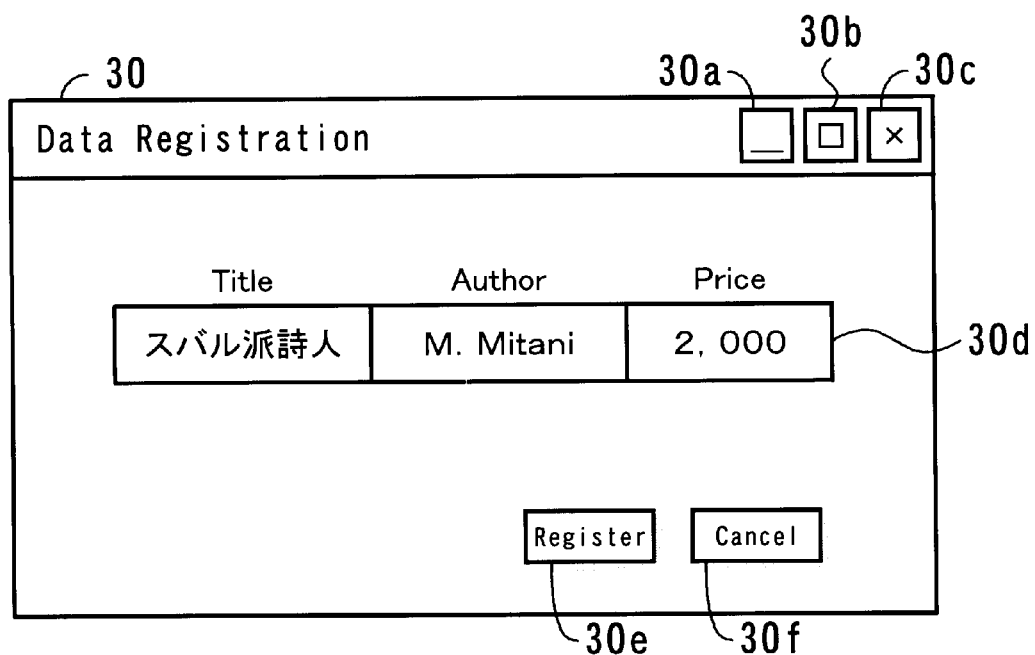
FIG. 4 is a diagram showing an example of a display screen displayed when data is to be stored in the database appearing in FIG. 2.

A screen shown in FIG. 4, for example, is displayed on the display device 14 of the client 13. In the screen, "スバル派詩人", " M. M i t a n i " and " 2, 0 0 0 " have been input as items corresponding respectively to "Title", "Author" and "Price", and when a Register button 30e is operated, "スバル派詩人", " M. M i t a n i " and " 2, 0 0 0 " are transmitted as registration data to the information retrieval system 10 through the network 12. The information retrieval system 10 receives the information transmitted thereto from the client 13 in Step S1.

[S2] The CPU 10a performs conversion of code system of the received data as needed.

[S3] The CPU 10a performs a process of normalizing the received data. The normalization process will be described in detail later with reference to FIG. 8.

[S4] The CPU 10a stores the normalized data and the source data, which is the data not subjected to the normalization, in the database 11 in a manner such that the former and the latter are associated with each other.

The normalization process according to this embodiment will be now described. Referring first to FIG. 5, normalization rules will be explained.

FIG. 5 illustrates the normalization rules. The figure indicates that items in the left-hand column are converted to corresponding items in the right-hand column. For example, the first item indicates that a "half-size symbol" is "left unchanged" (not converted). The second item indicates that a "half-size uppercase alphabetic character" is normalized to a "half-size lowercase alphabetic character". Similarly, a "half-size lowercase alphabetic character" is left unchanged, and a "full-size symbol" is normalized to a "half-size counterpart, if any, and left unchanged if no half-size counterpart exists". A "full-size numeric character" is normalized to a "half-size numeric character", a "full-size uppercase alphabetic character" is normalized to a "half-size lowercase alphabetic character", a "full-size lowercase alphabetic character" is normalized to a "half-size lowercase alphabetic character", and a "full-size alphabetic symbol" is normalized to a "half-size alphabetic symbol". A "full-size hiragana character" is left unchanged, a "full-size katakana character" is normalized to a "full-size hiragana character", a "half-size katakana character" is normalized to a "full-size hiragana character (for a half-size katakana character with the sonant mark or p-sound sign, to a corresponding full-size hiragana character), a "full-size uppercase/lowercase character" of "Cyrillic, Greek, Roman numerals", etc. is normalized to a "full-size uppercase character", and an "extended character" is normalized to a "standard character".

The normalization is performed according to the aforementioned rules for the reasons stated below.

(1) Reason for Normalizing Full-size Alphabetic Characters (Full-size Uppercase Alphabetic Characters, Full-size Lowercase Alphabetic Characters, Full-size Alphabetic Symbols, etc.) and Full-size Numeric Characters to Half-size Counterparts Half-size characters are represented in a 1-byte code system, and accordingly, word length can be reduced from 2 bytes to 1 byte.

(2) Reason for Converting Uppercase Characters to Lowercase Counterparts

In documents, lowercase character occurs at a higher frequency than uppercase character, and thus the number of times the conversion is repeated can be lessened.

(3) Reason for Normalizing Hiragana and Katakana Characters to Full-size Hiragana Counterparts In Japanese-language documents, the frequency of occurrence of hiragana characters is the highest, and therefore, the number of times the conversion is repeated can be lessened. Conversion to half-size katakana characters may lead to shorter word length, depending on the code system, but the handling of half-size katakana characters is poor. Even in currently available electronic mail software etc., for example, half-size katakana characters cannot be used and are in many cases converted internally into another format.

(4) Reason for Normalizing Cyrillic Characters, Greek Characters, Roman Numerals, etc. to Full-size Uppercase Characters It makes no great difference whether these characters are normalized to full-size uppercase or lowercase characters, but in this embodiment, the characters are normalized to full-size uppercase characters. In the Shift-JIS code, Roman numerals appear repeatedly before and after Kanji characters. For the sake of consistency, in this embodiment, the Roman numerals are normalized to those preceding Kanji characters.

(5) Reason for Normalizing Extended Characters to Standard Characters

Some characters appear twice (for example, in the Shift-JIS system, "√" is defined twice at "81E3" (standard character) and at "8795" (extended character)), and thus such characters need to be brought into consistency. In this embodiment, extended characters are normalized to standard characters.

FIG. 6 shows the correspondence between characters that are treated as identical according to the aforementioned rules. As shown in the figure, half-size uppercase character (A) and half-size lowercase character (a) are treated as identical characters. Similarly, half-size alphabetic characters (A, a) and full-size alphabetic characters (a, A), half-size symbol (@) and full-size symbol (@), and half-size numeric character (1) and full-size numeric character (1) are respectively treated as identical characters. Also, half-size katakana character (ア), full-size katakana character (ア) and full-size hiragana character (あ) are treated as identical characters. Likewise, half-size katakana character with the sonant mark/p-sound sign (ハ゛), full-size katakana character (バ) and full-size hiragana character (ば) are treated as identical characters. Further, full-size uppercase Greek character (Π) and full-size lowercase Greek character (π), full-size uppercase Cyrillic character (Я) and full-size lowercase Cyrillic character (я), full-size uppercase Roman numeral (IV) and full-size lowercase Roman numeral (iv), and full-size symbol (√(standard character)) and full-size symbol (√(extended character)) in the Shift-JIS system are respectively treated as identical characters.

Code page is a standard adopted in the industry in respect of character mappings representing individual code systems, to permit processing of a plurality of code systems. FIG. 7 illustrates the concept of Shift-JIS code page. In the Shift-JIS code, □ control characters □, □ Roman characters □ and □ katakana characters □ shown on the left-hand side of the figure are characters represented by 1-byte word length, and all other characters are represented by 2-byte word length. Common kanji characters, symbols, etc. are defined following □ 8140 □.

Figure 8:
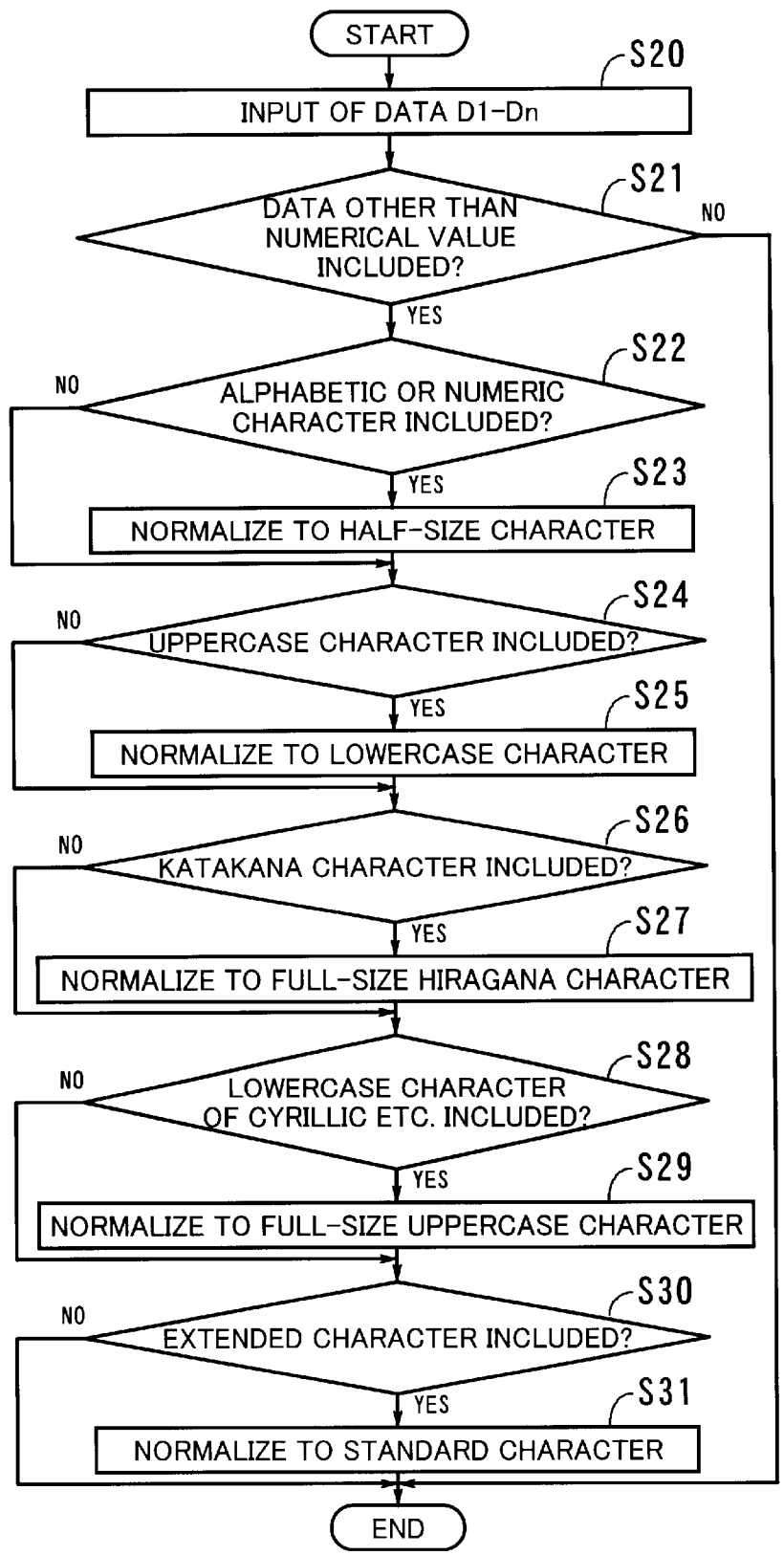
FIG. 8 is a flowchart showing an example of a process executed when data is normalized.

An example of the data normalization process according to the aforementioned rules will be now described. FIG. 8 is a flowchart illustrating the normalization process. Upon start of the process shown in the flowchart, the following steps are executed.

[S20] The CPU 10a is supplied with n (n≧1) pieces of data, D1 to Dn, via the I/F 10e.

[S21] The CPU 10a determines whether or not data other than numerical value (data to be converted) is included. If such data is included, the flow proceeds to Step S22; if not, the process is ended.

[S22] The CPU 10a determines whether or not data including a full-size alphabetic character (full-size uppercase alphabetic character, full-size lowercase alphabetic character, full-size alphabetic symbol, etc.) or a full-size numeric character exists. If there exists data including a full-size alphabetic or numeric character, the flow proceeds to Step S23; if not, the flow proceeds to Step S24.

[S23] The CPU 10a normalizes the full-size alphabetic or numeric character to a corresponding half-size character.

For example, if the data D1 consists of the full-size characters "Ａ Ｂ １ ２ ３", these characters are converted to the half-size characters "AB123".

[S24] The CPU 10a determines whether or not data including an uppercase character exists. If data including an uppercase character exists, the flow proceeds to Step S25; if not, the flow proceeds to Step S26.

[S25] The CPU 10a converts the uppercase character included in the data to a lowercase counterpart.

If, for example, the data D2 consists of the half-size characters "Tiny", these characters are converted to "tiny".

[S26] The CPU 10a determines whether or not data including a katakana character (full-size katakana character or half-size katakana character) exists. If such data exists, the flow proceeds to Step S27; if not, the flow proceeds to Step S28.

[S27] The CPU 10a converts the full-size or half-size katakana character to a full-size hiragana counterpart.

For example, if the data D3 consists of the full-size katakana characters "レモン" and the data D4 consists of the half-size katakana characters "ヒ゛テ゛オ", the former is converted to "れもん" to while the latter is converted to "びでお".

[S28] The CPU 10a determines whether or not there exists data including a full-size lowercase character such as a lowercase Cyrillic or Greek character, a lowercase Roman numeral or the like. If such data exists, the flow proceeds to Step S29; if not, the flow proceeds to Step S30.

[S29] The CPU 10a converts the lowercase character, such as a Cyrillic or Greek character, a Roman numeral or the like, to an uppercase counterpart.

If, for example, the data D4 consists of the full-size lowercase characters "α β γ", these characters are converted to the full-size uppercase characters "Α Β Γ".

[S30] The CPU 10a determines whether or not data including an extended character exists. If such data exists, the flow proceeds to Step S31; if not, the process is ended.

[S31] The CPU 10a normalizes the extended character to a standard character.

If, in the case of the Shift-JIS code system, for example, the data D5 includes the extended character "√" ("8795"), this character is converted to the standard character "√" ("81E3").

The above process makes it possible to normalize input data or keyword.

Figure 9:
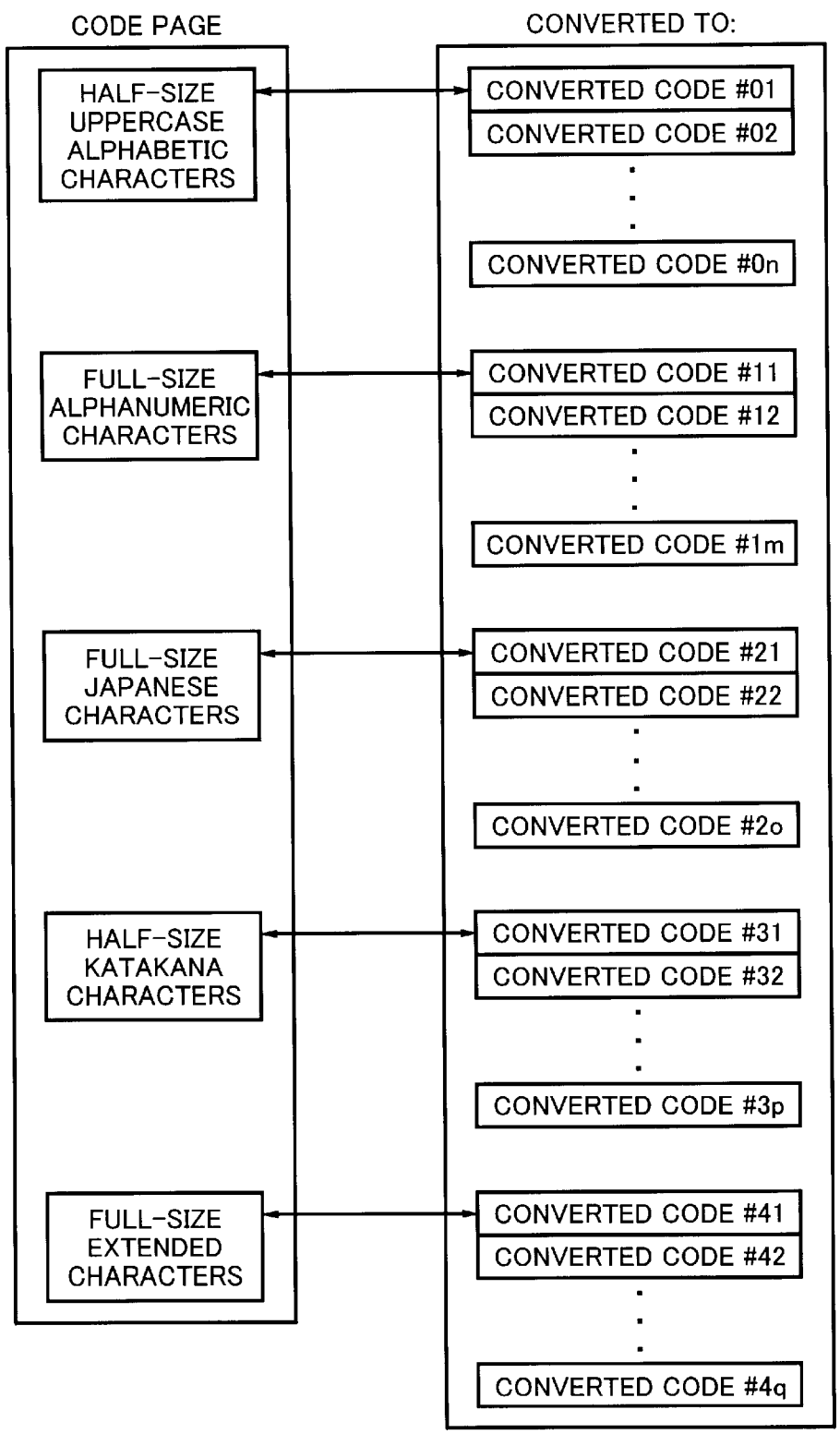
FIG. 9 is a diagram exemplifying code system conversion.

FIG. 9 shows an example of a conversion table used in the normalization process in Steps S23, S25, S27, S29 and S31 in FIG. 8. Codes of the code pages shown on the left-hand side of the figure are converted to codes shown on the right-hand side.

FIG. 10 illustrates how data input in the screen shown in FIG. 4 is stored in the database 11 by the process shown in FIG. 3. As shown in the figure, "スバル派詩人", " M. M i t a n i " and " 1, 8 0 0 " input in the screen shown in FIG. 4 are stored as the last items under "Input Title Column", "Input Author Column" and "Price", respectively. Under "Normalized Title Column" and "Normalized Author Column" for storing normalized data, "すばる派詩人" normalized from "スバル派詩人" by the process shown in FIG. 8 and "m. mitani" normalized from " M. M i t a n i " by the same process are stored, respectively. In the illustrated example, three other sets of data are stored in advance.

A process of searching the data stored in the database 11 in the aforementioned manner will be now described.

Figure 11:
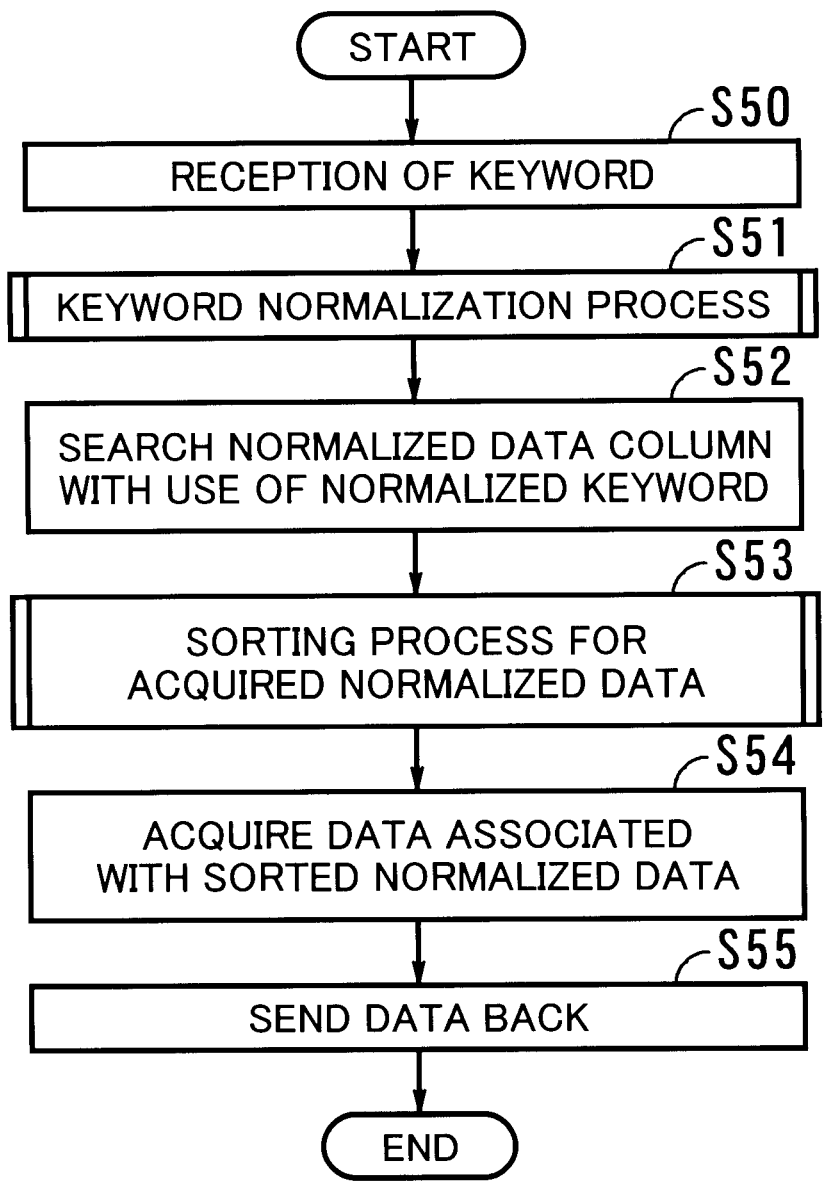
FIG. 11 is a flowchart illustrating an example of a process executed when data stored in the database appearing in FIG. 2 is searched.

FIG. 11 is a flowchart illustrating an example of a process executed by the information retrieval system 10 when the system is supplied with a specified keyword from the client 13 and requested to search for applicable data. Upon start of the process shown in the flowchart, the following steps are executed.

[S50] The CPU 10a receives a keyword transmitted thereto along with a search request from the client 13.

Figure 12:
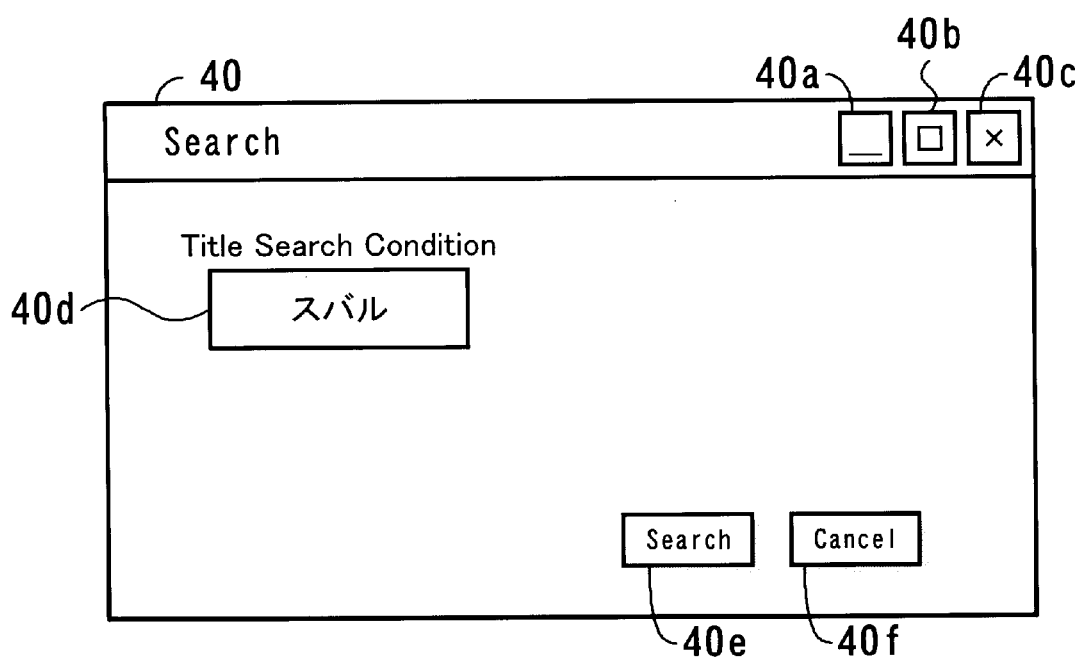
FIG. 12 is a diagram showing an example of a screen displayed when data stored in the database appearing in FIG. 2 is to be searched.

A screen shown in FIG. 12, for example, is displayed on the display device 14 of the client 13. On this screen, "スバル", for example, is input in a textbox 40d as a title search keyword and a Search button 40e for requesting start of search is operated, whereupon the keyword "スバル" is transmitted to the information retrieval system 10 over the network 12, so that the system 10 receives the keyword via the I/F 10e.

[S51] The CPU 10a performs a keyword normalization process.

This process is similar to that shown in FIG. 8, and thus the keyword is normalized by a process similar to the data normalization process. In this example, "スバル" is normalized to "すばる".

[S52] Using the normalized keyword, the CPU 10a searches the column of normalized data in the database 11 and acquires applicable data.

In this example, since the received keyword applies to title, the CPU 10a searches the "Normalized Title Column" shown in FIG. 10 and acquires data including "すばる". As a result, "すばる星のきらめき", "すばるとぶれやです星団" and "すばる派詩人" are acquired.

[S53] The CPU 10a sorts the thus-acquired normalized data. This process is accomplished by a program incorporated originally in the DBMS or the like.

In this example, "すばる星のきらめき", "すばるとぶれやです星団" and "すばる派詩人" are a target of sorting, and since the first three characters "すばる" are the same, order is determined by the succeeding characters "星", "と" and "派". "星", "と" and "派" are "90AF", "82C6" and "9468", respectively, in the Shift-JIS code, and are "661F", "3068" and "6D3E", respectively, in UNICODE. Sorting is carried out in ascending order of code, so that "すばるとぶれやです星団", "すばる星のきらめき" and "すばる派詩人" are arranged in this order.

The order of priority in sorting characters with different attributes (e.g., "kanji" and "hiragana") is the same for identical code systems, irrespective of the kind of DBMS or OS, and accordingly, data obtained as a result of the sorting is the same.

[S54] The CPU 10a acquires data associated with the thus-sorted normalized data.

In this example, data associated with the sorted normalized data "すばるとぶれやです星団", "すばる星のきらめき" and "すばる派詩人" is acquired from the "Input Title Column", "Input Author Column" and "Price" shown in FIG. 10. Specifically, for "すばるとぶれやです星団", "スハルとブレヤデス星団", "H. Suzuki" and " 2, 3 0 0 " are acquired. For "すばる星のきらめき", "すばる星のきらめき", "と" and " 2, 0 0 0 " are acquired, and for "すばる派詩人", "スバル派詩人" "M. Mitani" and " 1, 8 0 0 " are acquired.

[S55] The CPU 10a sends the acquired data back to the client 13 which has made the request.

Figure 13:
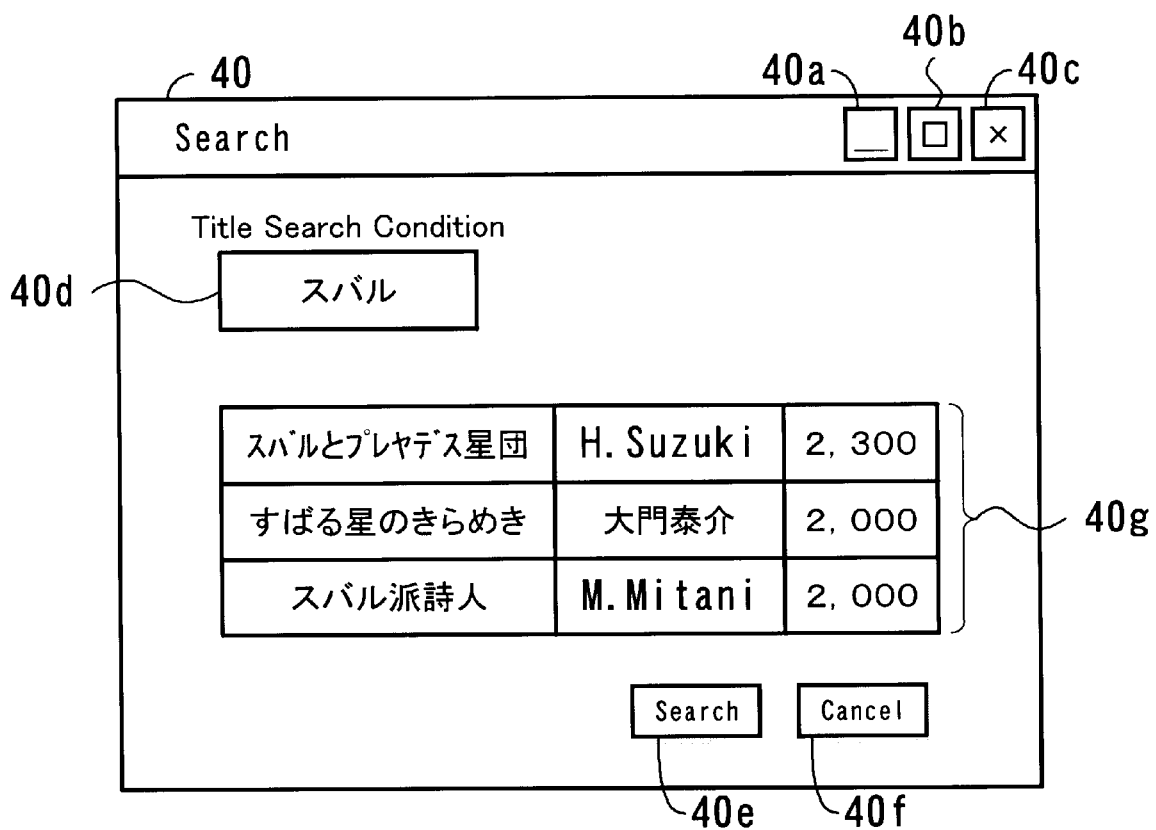
FIG. 13 is a diagram showing an example of a screen displayed as a result of the operation of a Search button in the screen shown in FIG. 12.

As a result, a screen as shown in FIG. 13 is displayed on the display device 14 of the client 13.

In the illustrated example, a window 40 entitled "Search" is displayed, and buttons 40a to 40c for minimizing, maximizing and closing the window 40, respectively, are shown in the upper right corner of the window 40.

In the textbox 40d in the upper left part of the display area is shown "スバル" which was previously input as the title search condition in the screen shown in FIG. 12.

Also, in a result display area 40g, data showing the search results is displayed. In the illustrated example, "スハルとブレヤデス星団", "すばる星のきらめき" and "スバル派詩人" are displayed as the applicable data.

According to the embodiment described above, source data and normalized data thereof are stored in the database in a manner associated with each other, search is performed using a normalized keyword, the normalized data obtained is sorted, and the corresponding source data is output, whereby identical search results can be derived irrespective of the kind of OS or DBMS.

Also, even in the case where an application program including a language-dependent sorting process is ported to another OS or DBMS, identical sorting results can be obtained.

Although, in the foregoing description of the embodiment, the configuration wherein the information retrieval system 10 is directly connected to the database 11 is explained by way of example, the information retrieval system may be connected to the database via a network. Also, in the above embodiment, search request to the information retrieval system is made from the client 13, but it may alternatively be made directly from a keyboard etc., not shown, connected to the information retrieval system 10.

Further, in the foregoing embodiment, data is normalized at the time of registration, but the present invention can be applied to existing databases by performing the normalization process shown in FIG. 8 on an existing database and storing the resulting normalized data in association with its source data.

The functions of the above-described processing can be implemented by a computer. In this case, the contents of the functions to be achieved by the information retrieval system are described in a program recorded in a computer-readable recording medium. By executing the program by a computer, it is possible to perform the above-described process. The computer-readable recording medium includes a magnetic recording device, a semiconductor memory and the like. To distribute the program to the market, the program may be stored in portable recording media such as CD-ROM (Compact Disk Read Only Memory) or floppy disk. Alternatively, the program may be stored in the storage device of a computer connected to a network and may be transferred to other computers through the network. To execute the program by a computer, the program stored in a hard disk unit or the like of the computer is loaded into the main memory and executed.

As described above, according to the present invention, an information retrieval system for searching a data storage section for data corresponding to a keyword supplied thereto and outputting the data comprises keyword normalizing means for normalizing a keyword supplied thereto, normalized data searching means for searching a normalized data group generated by normalizing original data by a process similar to that of the keyword normalizing means, from among data stored in the data storage section, to find normalized data corresponding to the keyword normalized by the keyword normalizing means, source data acquiring means for acquiring, from the data storage section, source data which is original data stored in association with the normalized data acquired by the normalized data searching means, sorting means for sorting the source data acquired by the source data acquiring means by looking up the corresponding normalized data, and source data supply means for supplying the source data sorted by the sorting means to a device which has requested search, whereby identical search results can be derived even with different DBMSs or OSs.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information retrieval system for searching a data storage section for data corresponding to a keyword supplied thereto and outputting the data, comprising:

keyword normalizing means for normalizing the keyword supplied thereto;

normalized data searching means for searching a normalized data group generated by normalizing original data by a process similar to that of said keyword normalizing means, from among data stored in the data storage section, to find normalized data corresponding to the keyword normalized by said keyword normalizing means;

source data acquiring means for acquiring, from the data storage section, source data which is original data stored in association with the normalized data acquired by said normalized data searching means;

sorting means for sorting the source data acquired by said source data acquiring means by looking up the corresponding normalized data;

source data supply means for supplying the source data sorted by said sorting means to a device which has requested search;

source data normalizing means for normalizing source data which is original data when new data is to be registered in the data storage section; and storing means for storing the normalized data obtained by said source data normalizing means and the source data not subjected to the normalization in the data storage section in a manner associated with each other.

2. The information retrieval system according to claim 1, further comprising source data acquiring means for acquiring unnormalized source data if the unnormalized source data alone is registered in the data storage section, source data normalizing means for normalizing the acquired source data, and storing means for storing the normalized data obtained by said source data normalizing means and the source data not subjected to the normalization in the data storage section in a manner associated with each other.

3. The information retrieval system according to claim 1, wherein said normalizing means converts an alphabetic character and a numeric character to corresponding half-size characters.

4. The information retrieval system according to claim 1, wherein said normalizing means converts an uppercase character to a corresponding lowercase character.

5. The information retrieval system according to claim 1, wherein said normalizing means converts an extended character to a corresponding full-size character if the corresponding full-size character exists.

6. The information retrieval system according to claim 1, wherein said normalizing means converts a full-size katakana character and a half-size katakana character to corresponding full-size hiragana characters.

7. The information retrieval system according to claim 1, wherein a character other than alphabetic characters and a symbol are converted to corresponding full-size uppercase characters.

8. A computer-readable recording medium recording a program for causing a computer to perform a process of searching a data storage section for data corresponding to a keyword supplied thereto and outputting the data, wherein the program causes the computer to function as keyword normalizing means for normalizing the keyword supplied thereto, normalized data searching means for searching a normalized data group generated by normalizing original data by a process similar to that of the keyword normalizing means, from among data stored in the data storage section, to find normalized data corresponding to the keyword normalized by the keyword normalizing means, source data acquiring means for acquiring, from the data storage section, source data which is original data stored in association with the normalized data acquired by the normalized data searching means, sorting means for sorting the source data acquired by the source data acquiring means by looking up the corresponding normalized data, source data supply means for supplying the source data sorted by the sorting means to a device which has requested search, source data normalizing means for normalizing source data which is original data when new data is to be registered in the data storage section, and storing means for storing the normalized data obtained by said source data normalizing means and the source data not subjected to the normalization in the data storage section in a manner associated with each other.

9. An information retrieval system for searching a data storage section for data corresponding to a keyword supplied thereto and outputting the data, comprising:

keyword normalizing means for normalizing the keyword supplied thereto;

normalized data searching means for searching a normalized data group generated by normalizing original data by a process similar to that of said keyword normalizing means, from among data stored in the data storage section, to find normalized data corresponding to the keyword normalized by said keyword normalizing means;

source data acquiring means for acquiring, from the data storage section, source data which is original data stored in association with the normalized data acquired by said normalized data searching means;

sorting means for sorting the source data acquired by said source data acquiring means by looking up the corresponding normalized data;

source data supply means for supplying the source data sorted by said sorting means to a device which has requested search;

source data acquiring means for acquiring unnormalized source data if the unnormalized source data alone is registered in the data storage section;

source data normalizing means for normalizing the acquired source data; and storing means for storing the normalized data obtained by said source data normalizing means and the source data not subjected to the normalization in the data storage section in a manner associated with each other.

10. An information retrieval system for searching a data storage section for data corresponding to a keyword supplied thereto and outputting the data, comprising:

keyword normalizing means for normalizing the keyword supplied thereto;

normalized data searching means for searching a normalized data group generated by normalizing original data by a process similar to that of said keyword normalizing means, from among data stored in the data storage section, to find normalized data corresponding to the keyword normalized by said keyword normalizing means;

source data acquiring means for acquiring, from the data storage section, source data which is original data stored in association with the normalized data acquired by said normalized data searching means;

sorting means for sorting the source data acquired by said source data acquiring means by looking up the corresponding normalized data;

source data supply means for supplying the source data sorted by said sorting means to a device which has requested search;

wherein said normalizing means converts a full-size katakana character and a half-size katakana character to corresponding full-size hiragana characters.

11. A computer-readable recording medium recording a program for causing a computer to perform a process of searching a data storage section for data corresponding to a keyword supplied thereto and outputting the data, wherein the program causes the computer to function as keyword normalizing means for normalizing the keyword supplied thereto, normalized data searching means for searching a normalized data group generated by normalizing original data by a process similar to that of the keyword normalizing means, from among data stored in the data storage section, to find normalized data corresponding to the keyword normalized by the keyword normalizing means, source data acquiring means for acquiring, from the data storage section, source data which is original data stored in association with the normalized data acquired by the normalized data searching means, sorting means for sorting the source data acquired by the source data acquiring means by looking up the corresponding normalized data, source data supply means for supplying the source data sorted by the sorting means to a device which has requested search, source data acquiring means for acquiring unnormalized source data if the unnormalized source data alone is registered in the data storage section, source data normalizing means for normalizing the acquired source data, and storing means for storing the normalized data obtained by said source data normalizing means and the source data not subjected to the normalization in the data storage section in a manner associated with each other.

12. A computer-readable recording medium recording a program for causing a computer to perform a process of searching a data storage section for data corresponding to a keyword supplied thereto and outputting the data, wherein the program causes the computer to function as keyword normalizing means for normalizing the keyword supplied thereto, normalized data searching means for searching a normalized data group generated by normalizing original data by a process similar to that of the keyword normalizing means, from among data stored in the data storage section, to find normalized data corresponding to the keyword normalized by the keyword normalizing means, source data acquiring means for acquiring, from the data storage section, source data which is original data stored in association with the normalized data acquired by the normalized data searching means, sorting means for sorting the source data acquired by the source data acquiring means by looking up the corresponding normalized data, source data supply means for supplying the source data sorted by the sorting means to a device which has requested search, wherein said normalizing means converts a full-size katakana character and a half-size katakana character to corresponding full-size hiragana characters.

* * * * *